July 22, 1924.
H. E. WARREN
TIME INDICATING APPARATUS
Filed April 2, 1920
1,502,494
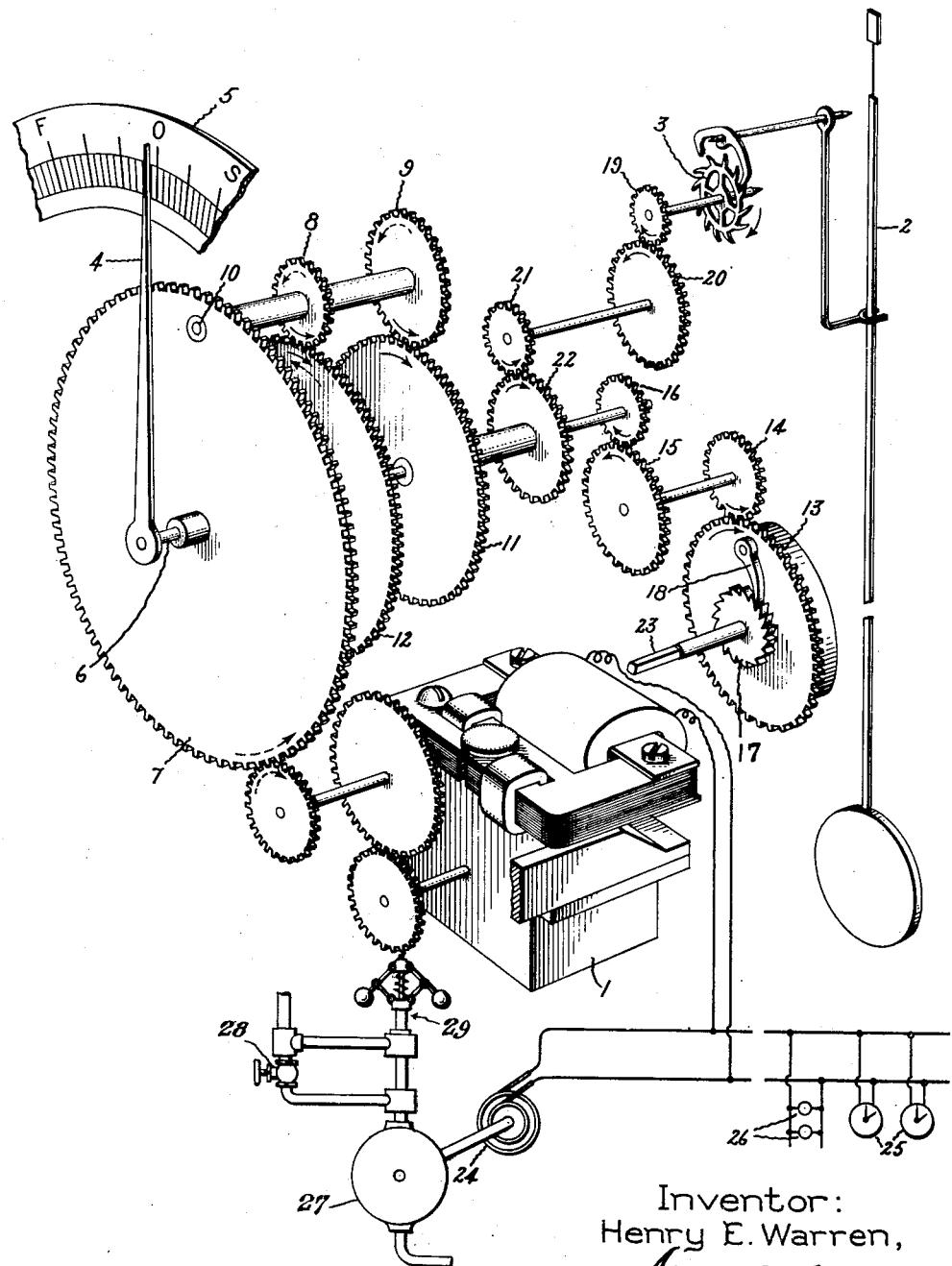
Inventor:
Henry E. Warren,
by *Albert G. Davis*
His Attorney Patented July 22, 1924.

1,502,494

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

TIME-INDICATING APPARATUS.

Application filed April 2, 1920. Serial No. 370,787.

*To all whom it may concern:*

Be it known that I, HENRY E. WARREN, a citizen of the United States, residing at Ashland, in the county of Middlesex, State of Massachusetts, have invented certain new and useful Improvements in Time-Indicating Apparatus, of which the following is a specification.

This invention relates to a system for the indication of time by means of secondary clocks driven by synchronous motors connected to a commercial source of alternating current. More particularly, my invention relates to the regulation of the frequency of an alternating current system so that the secondary clocks operated therefrom will indicate the correct time of day. For the furtherance of these objects, I furthermore make use of apparatus differing in many respects from that hitherto used for the purpose.

In my co-pending application, Serial No. 228,633, filed April 15, 1918, and assigned to the same assignee as this application, a time indicating apparatus is described comprising a master clock, used to indicate to the power station attendant whether the frequency of the system is at the correct value. From such an indication the operator knows whether the alternator supplying the system is to be speeded up or slowed down for the purpose of causing the secondary clocks to indicate the correct time. In that application a small synchronous motor, preferably of the self-starting type such as shown for example in Letters Patent granted in my name, No. 1,283,431, or 1,283,433 is connected to the system and used to operate one of two indicating means. The other indicating means is driven from a standard clock, comprising an accurately adjusted time piece. By comparing these two indications it was made possible to know whether the integrated frequency of the system is at the correct value. In the present instance the need of two separate indicating devices is obviated, a single indication serving to show whether there is coincidence in the time indicated by the standard clock and the time indicated by the secondary clocks of the system. Furthermore, in the present system any lengthy interruptions in the service automatically add up and the amount by which the secondary clocks are behind is indicated by the master clock directly. This function of the arrangement is automatic, since the self-starting motor is so arranged that its periods of rest are properly summed up. These advantages are due in a great measure to the use of my new type of master clock described in this application. The clock itself has certain novel features, whereby it is inexpensive to manufacture and very compact in arrangement.

The construction and mode of operation of my invention will be understood by reference to the accompanying drawing, in which the single figure shows a distorted perspective view of the clock, and the arrangement of the other parts of the system. This figure is mainly diagrammatic for the sake of clarity and the various gear elements of the master clock are shown displaced axially much further from each other than necessary in a physical embodiment.

Referring now more in detail to the drawing in which like reference characters refer to like parts throughout, the synchronous motor 1 is adapted to be connected to a commercial source of alternating current, which is to be regulated for constant average frequency, here shown as supplied by the alternator 24, driven by any appropriate source of mechanical power, such as the prime mover 27. I have also shown diagrammatically speed varying devices such as the hand operated valve 28 and the governor 29, whereby it is possible to regulate or change the speed of the alternator 24. The small motor 1 comprises one of the two movements, the speeds of which are to be compared by the master clock. The system is shown connected to a commercial load 26 comprising light and power and to secondary clocks 25. The other of these two movements comprises a standard clock movement, adjusted to keep time accurately. The clock movement is designated by the numeral 2, and since it is immaterial in the present instance just what form of clock movement is utilized, the device will not be described with greater detail. It is sufficient to state that the scape wheel 3 is adapted to be intermittently released by the pendulum so as to be advanced in the direction shown by the arrow.

The indicator or hand 4 and cooperating stationary scale 5 are arranged in such a way that rotation of said indicator 4 with its shaft 6 enables the central station operator to determine whether the frequency of the alternating-current system is slow or fast. When the indicator 4 is stationary, the alternating-current system has the proper frequency. Movement in one or the other direction shows a variation from a standard set frequency in a manner which will be described below.

The small self-starting synchronous motor 1 is geared to a large spur gear 7 loosely mounted upon an indicator shaft 6. This spur gear 7 carries two planet gears 8 and 9 arranged to rotate about the shaft 10 fastened to said spur gear and the axis of which is parallel with the axis of shaft 6. These two planet gears 8 and 9 are mechanically united so that they may be rotated together about the shaft 10. It is evident that rotation of the gear 7 by means of the synchronous motor 1 brings about an orbital movement of the planet gears 8 and 9.

The mechanical connections of the standard clock movement will now be described. The scape wheel 3 is connected through intervening gears to a spur gear 11 loosely mounted upon indicator shaft 6. The intervening gears are shown in this case as appropriately supported spur gears 19, 20, 21, and 22, but the number and size of the gears may vary according to requirements. The direction of rotation of gear 11 is indicated by the solid arrow thereon. This latter gear meshes with the larger of the two planet gears 9, tending to rotate it in the direction shown by the full arrow. The smaller of the two planet gears 8 meshes with a spur gear 12 rigidly fastened to the indicator shaft 6. A spring motor 13 is shown as supplying the necessary energy to the pendulum, under circumstances which will be later discussed. It is provided with means for rewinding, such as the squared shaft 23, ratchet 17 and stationary pawl 18, and is geared to the indicator shaft 6 through the intermediate gears 14, 15 and 16, tending to rotate said indicator shaft in a clockwise direction. The scape wheel 3 may, of course, perform its usual time indicating function just as an ordinary clock.

While there is shown one particular arrangement of reduction gearing from the various elements of the device to the indicator shaft 6, it is evident that by proper design of the gear ratios the indicator may be made to respond to variations from any definite frequency of the alternating-current system.

The manner of operation of the device may be perceived from the following considerations. Assume for the moment that the synchronous motor 1 has stopped for any reason whatever. In that case the planet gears 8 and 9 are not carried around orbitally, but are allowed to revolve about the temporarily stationary shaft 10. The escapement permits the planet gear 9 to rotate in the direction shown by the full arrow thereon. Since planet gear 8 is mechanically united with gear 9, the said planet gear 8 also rotates in the same direction. Since the gear 12 meshes therewith, it is evident that said gear is driven in a clockwise direction as shown by the full arrow. The rotation of this gear carries the indicator 4 in a clockwise direction and shows that the frequency of the alternating-current side is low, as it must be since the alternating-current system is inoperative. Assume now that the scape wheel 3 is stopped from rotation but that the synchronous motor 1 is rotating in synchronism with the frequency of the alternating-current system. In that case gear 11 is held stationary while planet gears 8 and 9 are given an orbital movement in a counter-clockwise direction as shown by the dotted arrow on gear 7. This orbital movement causes gear 11 to act as a stationary rack for the planet gear 9 whereby there is produced an axial rotation of said gear about shaft 10 in the direction of the dotted arrow. Were the size of the planet gear 8 equal to that of planet gear 9 and the size of gear 12 equal to that of gear 11, then the orbital movement of the two planet gears would not cause any rotation whatsoever of spur gear 12. This is due to the fact that the gear 8, rotating about its own axis 10 must have a relative movement with respect to gear 12 proportional to its speed and the number of teeth on its periphery. This relative movement may be taken care of in two ways; by movement of gear 8 about the center of gear 12, i. e. by an orbital movement, and secondly, by rotation of gear 12 about its own center. Now, if gear 8 is just as large as gear 9, the relative movement is taken care of by the orbital movement solely. However, the planet gear 8, as shown, is appreciably smaller than planet gear 9, and in order to make up this difference in size, it is evident that the gear 12 must rotate in the direction shown by the dotted arrow, because the relative movement between gears 8 and 12 must be less, there being less teeth on gear 8 than in the case just considered. This causes the indicator 4 to indicate "fast."

When both the synchronous motor 1 and the clock movement are in operation, the gear 11 imparts a greater speed of rotation to planet gear 9 than it would have were gear 11 stationary. This causes gear 8 to be correspondingly rotated faster. There must, therefore, be a greater relative movement between gears 8 and 12. If the speed of gear 11 is sufficiently great, then the requirement of proper relative movement between gears 8 and 12 may be fulfilled even though 12 remains stationary. Usually, however, we are concerned with variations in the speed of gear 7. If gear 7 be rotated too slowly, then the relative movement between gears 8 and 12 must be partly supplied by rotation of gear 12 in the direction of the full arrow. On the other hand, if gear 7 be rotated too fast, then to fulfill the requirement of proper relative movement determined by the speed of rotation of gear 11, the gear 12 must rotate in the direction of the dotted arrow. It is therefore evident that for a definite ratio of the speeds of the synchronous motor and of the clock movement, the gear 12 may remain stationary and the indicator 4 will move neither to the right nor to the left. This is an indication that the frequency of the system is at the correct value. The scale 5 also indicates variation from the required integrated frequency of the system. If the indicator 4 comes to rest at the right-hand side of the zero mark, then there is an indication that the total number of cycles is less than the correct amount, and the secondary clocks are slow, while if the indicator 4 comes to rest on the left-hand side of the zero mark, it is an indication that the number of cycles is greater than the correct amount and the secondary clocks are fast. The station attendant, therefore, knows exactly what to do by merely looking at one scale and pointer, instead of by comparing two different pointers as described in my prior application, and he either slows down the alternator 24 or speeds it up, as the conditions require, by manipulation of the speed changing means 28.

The spring motor 13 is shown as adapted to be wound by hand should it ever run down. The spring motor 13 does not unwind unless the synchronous motor 1 loses in cycles, as may be seen by following through the various intermediate gear movements. The pendulum 2, therefore, makes up its lost energy by getting a small impulse from the synchronous motor through the planet gears 8 and 9 and gear 11.

From the foregoing description it is evident that I have invented a system in which a master clock is used to subtract the motion of two gears and to indicate the residual motion. This indication sums up the total variation of the secondary clock time from the correct time, even though said total variation may be due to haphazard interruptions of the service or to gradual variations in the frequency of the alternating current system. In other words, the total accumulated excess of the secondary clocks over the master clock, or vice versa, is accurately indicated.

In the accompanying claims the terms "clockwise" and "counterclockwise" are made use of merely in a relative sense. While I have shown in the accompanying drawings the preferred embodiment of my invention, it is not limited thereto and I aim in the appended claims to embrace all modifications falling fairly within the scope of my invention.

What I claim as new and desire to secure by Letters Patent of the United States, is:—

1. In an instrument of the class described, a synchronous motor, a gear driven thereby, two planet gears of unlike size connected together carried by said first mentioned gear and free to rotate about their support, a clock movement, a gear controlled thereby, one of said planet gears meshing with said last mentioned gear, an indicator, a gear adapted to rotate the same, the other of said planet gears being operatively connected with said indicator rotating gear, whereby variations in the relative speeds of the motor driven gear and the clock-controlled gear may be observed by the movement of said indicator.

2. In an instrument of the class described, a pair of connected planet gears of unlike size, means for imparting a planetary motion to said gears, a clock movement, interconnecting gearing between one of said planet gears and said clock movement tending to rotate said planet gear about its own axis, an indicator, and gearing between said indicator and the other of said planet gears, the planetary movement of said planet gears being in such a direction that for a definite speed ratio between the planetary motion and the clock movement, the gearing between the indicator and one of the planet gears remains stationary.

3. In an instrument of the class described, a clock movement, another rotative movement, means for comparing the speeds of said movements, comprising a pair of connected planet gears of unlike size driven in their orbit by one of said movements, an indicator, gearing between said indicator and one of said planet gears, and gearing between the other movement and the other of said planet gears.

4. Means for indicating variations in the ratio of the speed between a clock movement and a motor movement, comprising a pair of connected planet gears of unlike size driven orbitally by one of said movements, and driven about their axis in response to the other of said movements, an indicator, and gearing arranged between said indicator and planet gears.

5. In an instrument of the class described, a shaft, an indicator arranged upon the shaft for rotative movement therewith, a stationary dial cooperating with the indicator, a gear loosely mounted upon said shaft, a motor driving said gear in a counterclockwise direction, a pair of gears carried by said first gear at a point away from its axis, said pair of gears being of unlike size and arranged for rotation about an axis parallel to the shaft, a gear meshing with the smaller of said pair of gears and fastened to the shaft of the indicator, a pendulum and an escapement, and a gear loosely mounted upon the indicator shaft driven in a clockwise direction at a rate determined by said escapement and meshing with the larger of said planet gears.

6. In a system for the distribution of time by means of self-starting synchronous motor driven secondary clocks connected to an alternating current system of distribution, means for indicating at the central station whether the secondary clocks are fast or slow with reference to a standard time piece, comprising a clock movement adjusted to keep time accurately, a self-starting synchronous motor connected to the system of distribution, a gear controlled by the clock movement, a gear driven by the synchronous motor and means for subtracting the motion of said two gears so as to indicate the residual motion.

7. In a system for the distribution of time by means of self-starting synchronous motor driven secondary clocks, connected to an alternating current system of distribution, means for indicating extended interruptions in the service that would cause the secondary clocks to indicate incorrectly, comprising a clock movement adjusted to keep time accurately, a self-starting synchronous motor connected to the system of distribution, a member driven by the clock movement, a member driven by the synchronous motor, and means for indicating the accumulated excess of motion of either member over the motion of the other.

8. In a clock system, the combination with a central station, an alternating current generator thereat supplying light and power through line conductors extending therefrom, and a series of secondary clocks, including a synchronous motor, at the subscribers' stations connected to said conductors, of means for changing the speed of said generator, a master clock and an indicator at the central station having a hand for indicating directly the departure of the alternations sent out by said central station from the time indicated by said master clock, whereby the attendant may be informed of the proper direction to manipulate said speed-changing means to bring said generator into synchronism with said master clock.

9. In a clock system, the combination with a central station, an alternating current generator thereat capable of supplying current for light and power, line conductors extending therefrom, and a series of secondary clocks, including a synchronous motor, at the subscriber's station connected to said conductors, of means for changing the speed of said generator, a master clock and an indicator at the central station, said indicator having a hand indicating directly the departure of the alternations of said generator from the time indicated by said master clock, whereby the attendant may be informed of the proper direction to manipulate the speed-changing means in order to bring said generator into synchronism with said master clock.

10. The combination with a source of alternating current for supplying light and power and a master clock, of means actuated in accordance with the alternations of the source of current for indicating time, and means for indicating directly the departure of the time indicated by said means from the master clock.

11. In a clock system, the combination with an alternating current generator for supplying light and power, and a master clock, of an indicating device, and means for causing the indicating device to be actuated in accordance with difference in the alternations of the generator and the indications of the master clock.

12. In a clock system, the combination with a commercial alternating current generator, a synchronous motor clock connected thereto and a master clock, of means connected between the clocks for indicating directly the deviation of the clocks from each other to facilitate regulating the frequency of the generator to effect synchronous operation of the clocks.

In witness whereof, I have hereunto set my hand this 30th day of March, 1920.

HENRY E. WARREN.